US012782203B2

(12) United States Patent
Smits et al.

(10) Patent No.: US 12,782,203 B2

(45) Date of Patent: Nov. 3, 2026

(54) CORE BODY TEMPERATURE SENSOR AND METHOD FOR THE MANUFACTURING THEREOF

(71) Applicant: Nederlandse Organisatie voor toegepast-natuumetenschappelijk onderzoek TNO, 's-Gravenhage (NL)

(72) Inventors: Edsger Constant Pieter Smits, Eindhoven (NL); Gerardus Titus Van Heck, Eindhoven (NL); Boris Rene Motrona Kingma, Rosmalen (NL); Jeroen Van Den Brand, Goirle (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 738 days.

(21) Appl. No.: 17/430,666

(22) PCT Filed: Feb. 19, 2020

(86) PCT No.: PCT/NL2020/050097

§ 371 (c)(1),
(2) Date: Aug. 12, 2021

(87) PCT Pub. No.: WO2020/171701

PCT Pub. Date: Aug. 27, 2020

(65) Prior Publication Data

US 2022/0128413 A1 Apr. 28, 2022

(30) Foreign Application Priority Data

Feb. 19, 2019 (EP) .................................... 19158064

(51) Int. Cl.
*G01K 1/16* (2006.01)
*G01K 13/20* (2021.01)

(52) U.S. Cl.
CPC ............. *G01K 1/165* (2013.01); *G01K 13/20* (2021.01)

(58) Field of Classification Search
CPC ............................... G01K 1/165; G01K 13/20
See application file for complete search history.

(56) References Cited

U.S. PATENT DOCUMENTS

2010/0121217 A1* 5/2010 Padiy ....................... G01K 1/16 600/549
2010/0268114 A1 10/2010 Van Duren (Continued)

FOREIGN PATENT DOCUMENTS

JP 2011133300 A 7/2011
JP 2015169551 A 9/2015

(Continued)

OTHER PUBLICATIONS

Steck, Luke N., Ephraim M. Sparrow, and John P. Abraham. "Non-invasive measurement of the human core temperature." International journal of heat and mass transfer 54.4 (2011): 975-982. (Year: 2011).*

(Continued)

*Primary Examiner* — Andrey Shostak
(74) *Attorney, Agent, or Firm* — Leydig, Voit & Mayer, Ltd.

(57) ABSTRACT

The present disclosure concerns a core body temperature sensor for measuring the core body temperature of a body in a non-invasive way via applying the core body temperature sensor to a surface of the bod. The core body temperature sensor comprises: at least a first thermistor pair of opposing thermistors across a first thermal insulator and a second thermistor pair, adjacent to the first thermistor pair, of opposing thermistors across a second thermal insulator, and a means to measure blood perfusion. The core body temperature sensor is an essential planar sandwich structure (Continued)

formed of the at least first and second thermistor pairs across the respective first and second thermal insulators sandwiched between opposing carriers. The present disclosure further concerns a method for determining a core body temperature and a method for the manufacturing of a core body temperature sensor.

8 Claims, 6 Drawing Sheets

(56) References Cited

U.S. PATENT DOCUMENTS

| | | | | |
|---|---|---|---|---|
| 2011/0051776 | A1* | 3/2011 | Bieberich | G01K 13/20 600/549 |
| 2015/0160079 | A1* | 6/2015 | Yarden | G01K 13/20 702/136 |
| 2018/0184908 | A1* | 7/2018 | Meyerson | A61B 5/6833 |
| 2018/0364109 | A1 | 12/2018 | Bongers et al. | |

FOREIGN PATENT DOCUMENTS

| | | | |
|---|---|---|---|
| JP | 2015534495 | A | 12/2015 |
| JP | 6358223 | B2 | 7/2018 |
| JP | 2019501389 | A | 1/2019 |
| WO | 2008068665 | A1 | 6/2008 |
| WO | WO 2011/012386 | A1 | 2/2011 |
| WO | WO 2018/152566 | A1 | 8/2018 |

OTHER PUBLICATIONS

Kei-Ichiro Kitamura et al., "Development of a new method for the noninvasive measurement of deep body temperature without a heater," Medical Engineering & Physics, No. 32, pp. 1-6 (2010).

European Patent Office, Examination Report in corresponding European Application No. 20707534.2 dated Nov. 17, 2023.

Japan Patent Office, Notification of Reasons for Rejection in corresponding Japanese Application No. 2021-548633 dated Dec. 19, 2023.

European Patent Office, International Search Report in corresponding International Application No. PCT/NL2020/050097, dated May 26, 2020 (3 pages).

* cited by examiner

CORE BODY TEMPERATURE SENSOR AND METHOD FOR THE MANUFACTURING THEREOF

CROSS-REFERENCE TO RELATED APPLICATIONS

This patent application is a U.S. National Phase of PCT International Application No. PCT/NL2020/050097, filed Feb. 19, 2020, which claims priority to European Application No. 19158064.6, filed Feb. 19, 2019, which are both expressly incorporated by reference in their entireties, including any references contained therein.

TECHNICAL FIELD AND BACKGROUND

The present disclosure relates to a core body temperature sensor and to a method for the manufacturing thereof.

An important parameter of the human body is the core body temperature. This temperature may provide information relating to a state of health and/or about the degree of thermal stress the body is enduring.

The temperature of the hypothalamus and the pulmonary artery in the rib cage are commonly used as standards for the core body temperature. Directly gauging these temperatures is not practical and potentially dangerous as these sites are embedded deep within the body. There are a number of techniques available relating to the measurement of the core body temperature. These include conventional contact thermometry, infrared thermometry, radiowave thermometry and thermometry based on the measurement of heat flow. Conventional contact thermometry applied to the rectum is generally believed to provide a reasonably accurate estimates of the core body temperature. A disadvantage of hereof is that this is generally considered to be an invasive method, whereas contact thermometry applied to less invasive body parts, e.g. in the mouth, on the fore head or in the arm pit are considered less accurate and/or less reproducible. IR thermometry, e.g. in-ear IR measurements, is non-invasive but is disadvantageous for measuring core body temperature at least because measurements may be less accurate as readings are affected by IR probe position and measurement angle. Radiowave thermometry, for example a telemetric pill, is disadvantageous for assessing core body temperature of a subject at least because the subject is required to swallow a pill. The method is further disadvantageous because measurements can be affected by digested foods and further because of potential health risks, e.g. inflammatory and/or damage to digestive tissue. Thermometry based on the measurement of heat flow (flux) aims to obtain a core temperature of an object by measuring heat flow and/or temperature gradients from the object to the outside, e.g. ambient. As heat is transferred from a hotter medium to a ambient, the magnitude of the heat flux depends on the heat conducting properties of the medium and layers surrounding the medium and on temperature differences between medium, layers and ambient. Thermometry based on the measurement of heat flow (flux) includes the zero-heat flow method (ZHFM) and dual sensor method (DSM).

In the ZHFM the core temperature of a body is derived using a pair of sensors measuring a temperature gradient over a layer that is in contact with an outside surface, e.g. skin, of the body. An external heater element covering the layer is heated until the heat flux reaches zero. The temperature at which at which the temperature gradient is zero, i.e. zero heat flux, equates to the core body temperature. Despite being non-invasive ZHFM methods are disadvantageous at least because they require significant amounts of energy to operate. Furthermore prolonged heating may cause burn risks and/or increase the temperature of the skin and/or sub-cutaneous tissue, e.g. muscles, which in turn may result in reduced accuracy of core body temperature measurements.

The dual sensor method (DSM) also uses a device with a pair of sensors measuring a temperature gradient over an insulating layer that is in contact with an outside surface of the body, but without temperature compensation from an external heater. In the dual sensor method the core body temperature is calculated by equating the heat flow (flux) from the skin to ambient, i.e. a conduction pathway though the insulating layer, to the heat flow from the core of the body to the skin, i.e. a conduction pathway through the skin. The calculation however requires accurate knowledge of thermal resistance values of both conduction pathways or at least the ratio of both thermal resistance values. These values vary between bodies (persons) and requires careful calibration.

Kitimura et al. have disclosed an alternative method and probe for non-invasive probing of core body temperature (Kitamura, *Med. Eng. & Phys,* 2010, 32, 1-6). The probe consists of a two pairs of temperature sensors each disposed across thermal insulator layers having a different thickness to form dual heat flow channels with different thermal resistances. By arranging the dual heat flow channels close to each other the heat balance of outgoing heat fluxes over each of the channels can be rearranged to eliminate the skin resistance.

Although the dual heat flow method (DHFM) as disclosed by Kitimura can be used to determine a core body temperature the probe and method suffer from a number of disadvantages. These include a slow response time, e.g. the initial response time of the reported DHFM probe is approximately double that of a comparative DSM based measurement. Furthermore, the rather bulky design of the probe, having heat flow channels across thermal insulator layers with different thicknesses is prone to lateral heat loss (lateral heat dissipation). In other words, the vertical design of the thermal insulator allows heat to not only dissipate in a direction along the insulator layer thickness but also allows heat to dissipate in a side-ways direction. These heat losses are not accounted for in the following determination of the core body temperature reducing the accuracy of the reported probe. In addition, the vertical design of the thermal insulator hinders effective mass production of the probe, for example already since capping layers covering the probe need to be provided such that these accurately follow the 3D geometry of the thermal insulator layers.

The presently disclosed core body temperature sensor aims to mitigate at least one of the above or further disadvantages.

SUMMARY

Aspects of the present disclosure relate to a core body temperature sensor for measuring the core temperature of a body or object via applying the core body temperature sensor to a surface of the body. The core body temperature sensor comprises at least a first thermistor pair of opposing thermistors across a first thermal insulator and a second thermistor pair adjacent to the first thermistor pair of opposing thermistors across a second thermal insulator. Preferably, the core body temperature sensor is an essentially planar sandwich structure formed of the at least first and second thermistor pairs across the respective first and second thermal insulators sandwiched between opposing carriers. Preferably, the thermal resistance of the first thermal insulator differs from the thermal resistance the second thermal insulator differ to, in use, allow determining, e.g. calculating, the core body temperature from a measured temperature drop (temperature gradient) across the first and second thermal insulators resulting from an outward heat flux from the core of the body to ambient. Preferably, determining the core body temperature starts after reaching an equilibrium or near equilibrium temperature gradient across the respective thermal insulator layers. By determining the core body temperature after reaching an equilibrium or near-equilibrium temperature gradient (within the time frame of a measurement) across the thermal insulator layers may improve accuracy of the measurement. Alternatively or in addition, the core body temperature may be measured continuously or repeatedly, e.g. during a given period of time, to measure changes, e.g. fluctuations, in the temperature of the core of the body. The core body temperature sensor comprises a means to measure blood perfusion. By measuring blood perfusion a disturbing contribution of heat flow due to skin blood flow on the total heat flow (flux) through the sensor may be determined. Correcting the determined outward heat flux across the sensor for contributions due to blood perfusion, e.g. variations in blood perfusion, can advantageously be used to provide a more accurate estimate of heat flow due to a subjects core metabolism and can accordingly provide a more accurate reading of the core body temperature.

Preferably, the thermistors are selected to accurately determine the temperature drop across the respective thermal insulators. In case the subject of interest is a person expected temperature fluctuations are small. Particularly suitable to record small temperature fluctuations are so-called negative temperature coefficient (NTC) thermistors, also known as NTC resistors or NTC sensors of which the electrical resistance decreases with increasing temperature in a reproducible way. Typically, NTC sensors allow determining the temperature at the sensor location via measuring of a voltage, e.g. voltage drop. Preferably, the resistance of the NTC sensor decreases with temperature in a linear fashion, at least over the temperature range of interest. Alternatively or in addition, the temperature dependence of the NTC sensor may be approximated over a given range, e.g. a third order approximation such as the Steinhart-Hart equation. Preferably, the thermal resistance of one of the thermal insulators, e.g. the first thermal insulator is in a range between 0.01 and 0.5 W/mK, such as about 0.25 W/mK, more preferably in a range between 0.01 and 0.3 W/mK, such as about 0.02 or about 0.03, about 0.05 or about 0.07 W/mK. Preferably, the thermal resistances of the first and second thermal insulator further differ by a factor of at least 1.2, preferably at least 1.5, most preferably at least 2. Use of a thermal insulator with a higher thermal resistance may result in the formation of a larger temperature gradient (temperature drop) across said layer due to an outward flux of heat from the body core to ambient. Using two layers with a large difference in thermal resistance between the layers may result in formation differing temperature drops across said layers wherein the magnitude will increase with increasing difference in thermal resistance between the respective layers. Increasing the difference between temperature drops over the two layers may improve resolution of the core body temperature sensor. Preferably, thermal insulators are formed from materials selected from a group consisting of rubbers and foams such as closed cell foams. For example, polyurethane foams, polyurethane rubbers and polypropylene foams. It will be appreciated that thermal insulators formed from other materials providing the suitable thermal resistances and resistance ratios as described herein may be used as well. Use of an air gap as thermal insulator layer may be less preferred as convection within the layer may negatively affect the formed thermal gradient. Preferably, the first and second thermal insulator have a matching thickness or have a thickness that allows forming a sandwich structure wherein the respective layers are essential level. By providing thermal insulator layers with a matching thickness a core body temperature sensor may be formed that is essentially planar. Preferably, the opposing carries may be formed of a single folded structure, e.g. a foil. Forming the core body temperature sensor from a single folded structure advantageously at least improves the manufacturability. By using a single foldable structure, components of the core body temperature sensor including the thermistors may be provided on a single structure, e.g. foil. Advantageously, wiring to these components including the thermistors may be provided to the same foldable structure and/or may be led to a single connector. Further, using a single foldable structure may improving scalability of the core body temperature sensor. In other words the core body temperature sensor may comprise more than two adjacent thermistor pairs, e.g. 3 pairs or more, an array, or even additional sensors. Providing the components on a single foldable substrate facilitates, reduces complexity, e.g. alignment issues, in relation to the formation of a sandwich structure with opposing thermistors.

A planar core body temperature sensor may, in use, have improved wearing comfort. Further, a planar core body temperature sensor may be manufactured more effectively and a planar core body temperature sensor may have improved accuracy and/or a shorter response times as will become clear herein below. In a preferred embodiment the core body temperature sensor forms a patch for wear on an area of skin of a person. Preferably the sensor (patch) may be worn without skin irritation for a prolonged period of time e.g. a period in excess of 3 hours, preferably a period in excess of 8 hours, e.g. overnight, more preferably a period in excess of one day, e.g. 48 hours or even longer such as a week.

According to a further aspect the present invention relates to a method of determining the core body temperature. The method comprises: providing a core body temperature sensor including a means to measure blood perfusion. The method further comprises correcting a determined heat flow across the first and second thermal insulators for heat flow due to skin blood flow, wherein determining a value of heat flow due to skin blood flow comprises multiplying a predetermined baseline value of heat flow due skin blood perfusion with a ratio of a temporal output value of the means to measure blood perfusion to a reference value of the means to measure blood perfusion.

In some embodiments, the method comprises measuring a heat flow across the first and second thermal insulators using at least three adjacent thermistor pairs. By using a core body temperature sensor comprising at least three adjacent thermistor pairs, preferably an array, errors may be corrected that relate to a possible poor contact between the core body temperature sensor and the surface of the body. Further, temperature differences in adjacent thermistors and/or differences in observed temperature drops over adjacent thermistor pairs may be used to correct a determined core body temperature for lateral heat dissipation effects, e.g. within the sensor and/or for lateral heat flow due to blood perfusion of the skin.

According to yet a further aspect the present invention relates to a method for the manufacturing of a core body temperature sensor for measuring the core temperature of a body via applying the core body temperature sensor to a surface of the body. The method comprises: providing conductive leads for electrically connecting at least a first and second adjacent thermistor onto a first carrier in a first pattern; providing conductive leads for electrically connecting at least a third and fourth adjacent thermistor onto a second carrier. In one embodiment the method further comprises forming the first and second carriers into a single folded structure. In other words, parts of the core body temperature sensor may be provided on a single substrate to form a folded structure. In one embodiment, the method further comprises placing thermistors, for example placing commercially available NTC sensors, onto the respective conductive leads. The method further comprises: providing a first thermal insulator to cover the first thermistor; providing a second thermal insulator, different from the first, adjacent to the first to cover the second thermistor; and sandwiching the first and second thermal insulators between the first and second carrier to form an essentially planar sandwich structure. Preferably, the first and second patterns are arranged to, upon sandwiching, form at least a first thermistor pair of opposing thermistors across the first thermal insulator and an adjacent second thermistor pair of thermistors across the second thermal insulator wherein the thermal resistance of the first thermal insulator and the thermal resistance of the second thermal insulator differ to, in use, allow calculating the core body temperature from measured temperature differences across the first and second thermal insulators. As explained herein below the sensor includes a means 18 to measure blood perfusion. Said is preferably positioned in close proximity to the first and second thermistor pairs.

BRIEF DESCRIPTION OF DRAWINGS

These and other features, aspects, and advantages of the device, methods, and uses of the present disclosure will become better understood from the following description, appended claims, and accompanying drawings wherein:

DESCRIPTION OF EMBODIMENTS

Figure 1A:
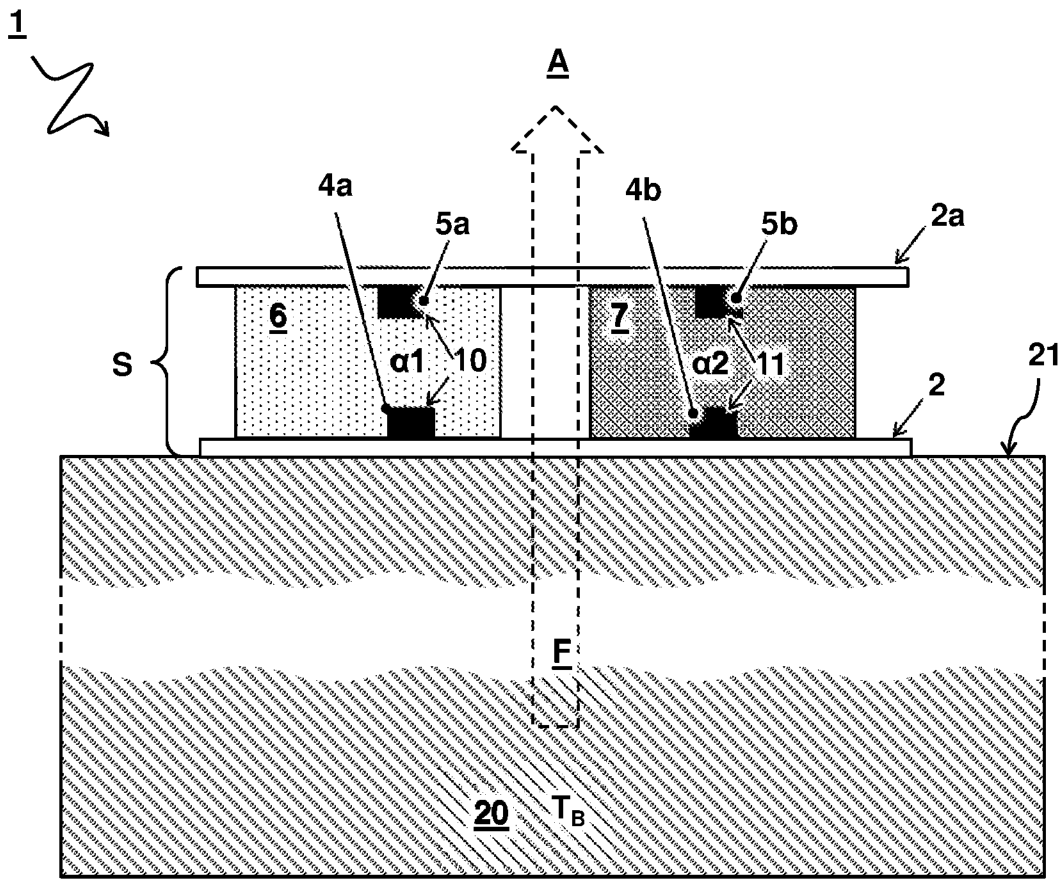
FIG. 1A schematically depicts a cross-section side view of a core body temperature sensor.

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

The invention is described more fully hereinafter with reference to the accompanying drawings, in which embodiments of the invention are shown. In the drawings, the absolute and relative sizes of systems, components, layers, and regions may be exaggerated for clarity.

Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

The core body temperature sensor according to the present disclosure may be used to determine the core temperature of a body via applying the core body temperature sensor 1 to a surface area of said body. Accordingly, the core body temperature sensor may be used to determine the temperature of a person, e.g. body parts of a person, by applying the core body temperature sensor to an area of skin of said person. For example, by applying the core body temperature sensor 1 to the torso of a person, e.g. on the chest, or on the back, may allow determining the temperature at a location below the sensor, i.e. inside the respective body part. More specifically, by applying the sensor to the fore-head of a person may allow determining the core body temperature of the head, whereas application of the sensor to an upper leg may allow determining the temperature inside said leg, e.g. the muscle temperature. It will be appreciated that use of core body temperature sensor 1 is not restricted to persons or body parts of persons. The core body temperature sensor 1 may provide similar benefits on other bodies displaying an outward heat flow including animals and inanimate objects such as (chemical)reactors and heated buildings.

FIG. 1A schematically depicts a cross-section side view of a core body temperature sensor 1 applied to a surface 21 of a body 20 having a core body temperature $T_B$. For clarity reasons electrically conductive wiring is not shown. The white wavy structure in the body indicates that the core of the body and its surface 21 may be relatively far apart, nevertheless still in thermal contact. The core body temperature sensor 1, e.g. as shown, comprises: at least a first thermistor pair 10 of opposing thermistors 4*a*, 5*a* across a first thermal insulator 6; and a second thermistor pair 11, adjacent to the first thermistor pair 10, of opposing thermistors 4*b*, 5*b* across a second thermal insulator 7. Preferably, the core body temperature sensor 1 is an essentially planar sandwich structure S formed of the at least first and second thermistor pairs 10,11 across the respective first and second thermal insulators 6,7 sandwiched between opposing carriers 2, 2*a*. The opposing carriers may be formed from a single folded structure (not shown). The thermal resistance α1 of the first thermal insulator 6 and the thermal resistance α2 of the second thermal insulator differ to, in use, allow calculating the core body temperature $T_B$ from measured temperature differences across the first and second thermal insulators 6,7 resulting from an outward heat flux F from the core of the body to ambient A.

In a preferred embodiment, the least first and second thermistor pairs 10,11 are placed at central positions across their respective thermal insulator layer. Inventors found that by providing the least first and second thermistor pairs 11 at a central position sensors are, in use, exposed to an essentially flat heat profile, e.g. a profile wherein a temperature gradient is essentially oriented in a direction between the thermistor pair. In other words, lateral heat dissipation effects are minimized, e.g. lateral heat dissipation effects dissipates less than 10%, preferably less than 5% of the outward heat flux F.

Preferably, the first and second thermistor pairs are spaced relative close to each other such that, in use, both pairs may be positioned above, e.g. contact with, an area of skin having similar heat conduction properties. In other words both pairs are preferably positioned such that each pair is exposed to similar conditions, e.g. an area of skin with similar thermal resistance, e.g. an area of skin with similar blood perfusion and similar thickness. Preferably, the temperature difference (temperature gradient across the resistor) between the opposing thermistors 4*a*,4*b*; 5*a*, 5*b* is large, e.g. at least larger, preferably at least 3 times, more preferably at least 10 times larger than the noise level of the thermistors, such that the temperature difference (temperature drop across the resistor) can be measured effectively. Larger temperature differences allow for more accurate temperature drop determination. Inventors found that a practical minimum temperature drop, e.g. when using NTC sensors, across the opposing thermistors is at least 0.1° C., e.g. 0.2° C., preferably at least 0.5° C., e.g. 1° C. or 2° C. Although increasingly large temperature drops, i.e. thick thermal insulator layers, may be preferable from an accuracy view point the practical thermal insulator thickness may be limited by lateral heat dissipation. Inventors found that increasing the thickness of a thermal insulation layer for a given width increases the contribution of lateral heat dissipation to the temperature profile, e.g. equilibrium temperature profile, within the thermal insulator, e.g. insulation layer. Increasing the width for a given thickness reduces the contribution of lateral heat dissipation to the heat profile, e.g. equilibrium heat profile, within the layer. Increasingly thick insulator layers may, in use, further increase the time required for the sensor to attain an equilibrium response after a given disturbance, e.g. a change in core body temperature. For example, the time to reach a stable equilibrium response from the core body temperature sensor 1 after a sudden change in core body temperature will increase for sensors comprising increasingly thick thermal insulator layers.

In some preferred embodiments, e.g. suitable for an intended use on the body, e.g. of a person, inventors found that the diameter of the core body temperature sensor 1, e.g. thermal insulator, is preferably in a range between 5 mm and 300 mm for example 200 mm, preferably in a range between 10 and 100 mm, for example 15 mm, more preferably in a range between 20 and 70 mm, for example 30 or 40 mm. The upper limit may be defined by a dimension of the surface 21 of the body 20 to be measured. For example the target surface area may be a fore head or an area on the torso or limbs of the person. The lower limit may be defined by a minimum dimension of the thermistor. The lower limit may further be defined by a minimum dimension of the thermal insulator covering the thermistor wherein the temperature profile, e.g. steady state temperature profile, within the thermal insulator is essentially planar i.e. the temperature gradient within the thermal insulator is essentially arranged in a direction between the opposing thermistor pairs. In other words a minimum dimension may be defined by a minimal dimension of the thermal insulator wherein, in use, heat loss in a side-ways direction i.e. along the surface 21 of the body 20 to be measured, is negligible compared to the heat dissipation heat flux in a direction across the sandwich structure S. In order to provide a sufficiently flat equilibrium temperature profile inventors found that the thermal insulators 6,7 preferably have an aspect ratio, defined as a thickness divided by a length, in a range between 0.5 and 0.001, for example 0.4 or 0.05, preferably in a range between 0.3 and 0.05, for example 0.2 or 0.1, more preferably in a range between 0.2 and 0.1, for example 0.13. Accordingly, inventors found that, the thickness of the thermal insulation layer may, for example, preferably be around 4 mm, e.g. 3 mm or 4.5 mm and the width around 30 mm. Alternatively, the thickness may be around 2 mm, e.g. 1.5 mm or 2.5 mm and the width may be 15 mm. Alternatively, the thickness may be around 3 mm, e.g. 2 mm or 3.5 mm and the width may be 40 mm. Optionally, the thermal insulator layer may be even thicker, e.g. 5 mm, 10 mm or even 20 mm such as a conformable thick foam.

In other or further preferred embodiments, portions of the outer perimeter of the first and second thermal insulator 6,7 are complementary to each other to from a continuous thermal insulation layer, e.g. insulation barrier. By providing the core body temperature sensor 1 with adjoining thermal insulators an air gap between the thermal insulator layers may be avoided. By providing complementary thermal insulator layers, e.g. a continuous thermal insulation, layer side-ways heat dissipation from the insulation layers may be reduced at the interface between the adjoining thermal insulator layers. By reducing lateral heat dissipation an overall dimension of the thermal insulator layer, e.g. continuous thermal insulator layer may be reduced compared to a sensor comprising thermal insulator layers separated from each other by an air gap, e.g. a convection pathway to ambient.

Figure 1B:
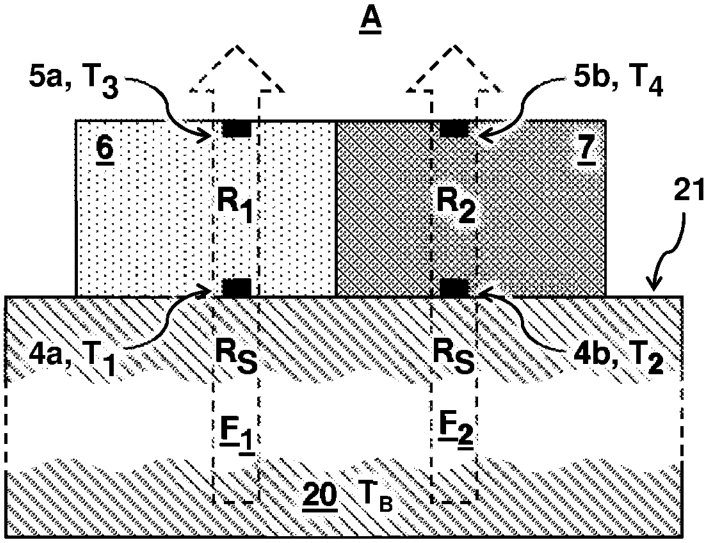
FIG. 1B schematically illustrates heat flows and accompanying temperatures though a core body temperature sensor.
Figure 1C:
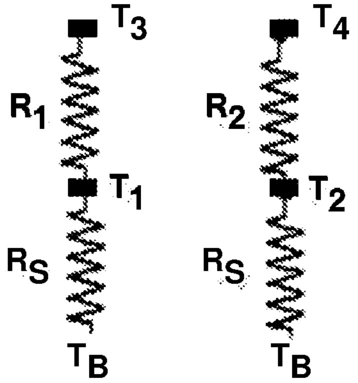
FIG. 1C provides a simplified model of heat flows and thermal resistances within a core body temperature sensor.

Without wishing to be bound by theory inventors believe that the core body temperature $T_B$ may be determined using a model for the DFHM as initially described by Kitimura et al. In the model, the outward heat flux from deep body tissue through a layer of skin and subcutaneous tissue to ambient is modeled by an equivalent heat conduction circuit. FIG. 1B schematically depicts a cross sectional side view of a body 20 having core body temperature $T_B$ covered by a first and second thermal insulator 6,7 each provided with opposing thermistors 4*a*, 5*a*, and 4*b*, 5*b*. FIG. 1C depicts the equivalent heat conduction circuit. An outward heat flux $F_1$, $F_2$ from the core to ambient A via the skin 21 causes temperature drops across the respective thermal insulators. The magnitude of these temperature drops ($T_1-T_3$) and ($T_2-T_4$) may be measured via the provided thermistors 4*a*, 5*a*, and 4*b*, 5*b* and depends on the heat conductivity of the respective thermal insulators $R_1$, $R_2$, and on the heat conductivity of the tissue below the thermal insulators $R_S$. Inventors find that the heat conductivity of the tissue below the respective thermal insulators may be assumed equal for each pathway provided that both temperature drops are measured relatively close to each other, e.g. provided that the blood perfusion in the tissue below the thermistor pairs 10,11 may be assumed equal. By equating the heat flows $F_1$,$F_2$ across the respective pathways to each other (eq.1) and by re-writing the respective equations the core body temperature $T_B$ may be calculated (eq.2) without determining the thermal resistance of the tissue below the thermal insulators $R_S$.

$$F_1 = \frac{(T_3 - T_1)}{R_S} = \frac{(T_1 - T_3)}{R_1} = F_2 = \frac{(T_B - T_2)}{R_5} = \frac{(T_2 - T_4)}{R_2} \quad \text{(eq.1)}$$

$$T_B = \frac{T_1 \cdot (T_B - T_2) \cdot K - (T_1 - T_2) \cdot T_2}{(T_2 - T_4)K - (T_1 - T_3)} \text{ with } K = \frac{R_1}{R_2} \quad \text{(eq.2)}$$

In another or further preferred embodiment, the core body temperature sensor is stretchable. Preferably, the carrier 2 is a stretchable carrier. Providing a stretchable carrier may facilitate applying the core body temperature sensor 1 to non-flat bodies, e.g. a fore head or torso of a person, in a conformal way. Providing the core body temperature sensor 1 to the body 20 in a conformal way may improve thermal contact to the sensor, e.g. reduce the number of air inclusions between body and sensor. Providing the core body temperature sensor 1 to the body 20 in a conformal way may improve accuracy of the core body temperature $T_B$ measurement and/or may improve comfort for the wearer. Optionally or in addition, further components of the core body temperature sensor 1, such as one or more of the thermistors and/or one or more of the wiring for electrically connecting to the thermistors, and/or one or more of the thermal insulators may be stretchable. In another or further preferred embodiment, the core body temperature sensor, further comprises stretchable conductive wiring 14 for reading out signals from at least one or more of the thermistors 4*a*,4*b*, 5*a*,5*b*. Preferably, the carrier and/or one or more of the further components, e.g. wiring, of the core body temperature sensor 1 is stretchable by at least 1%, preferably at least 5%, e.g. 7% more preferably by at least 10%, e.g. 15%, 20% or even 30% up to 100% without loss of function of the core body temperature sensor 1. Preferably, the carrier has low moisture permeability to prevent moisture uptake in the sandwich structure S, e.g. in the first and second thermal insulators 6,7. Alternatively or in addition, a moisture barrier layer may be added to, in use, reduce uptake of humidity in the sandwich structure S. Uptake of moisture in the sandwich structure S may affect the thermal resistances α1,α2 of the first and second thermal insulators 6,7. Inventors found that carrier and/or moisture barrier layers formed of a polyurethane and/or silicone material may be particularly suited.

In some preferred embodiments, e.g. as shown in FIB 2A the core body temperature sensor 1 is provided with a thermally insulating cover layer 15 to, in use, shield the core body temperature sensor 1 (sandwich structure S) from ambient temperature fluctuations, for example induced by air flows, e.g. wind. The thermally insulating cover layer 15, is preferably provided to an outward face of the sandwich structure S and preferably covers at least the first and second thermistor pairs 10,11. Optionally or additionally, the thermally insulating cover layer 15 may, in use, completely cover the core body temperature sensor 1. Preferably, the thermally insulating cover layer 15 layer comprises a thermal insulation material, e.g. a foam. Optionally or additionally, the thermally insulating cover layer 15 may comprise a reflective layer to shield the core body temperature sensor 1 from thermal radiation.

Figure 2A:
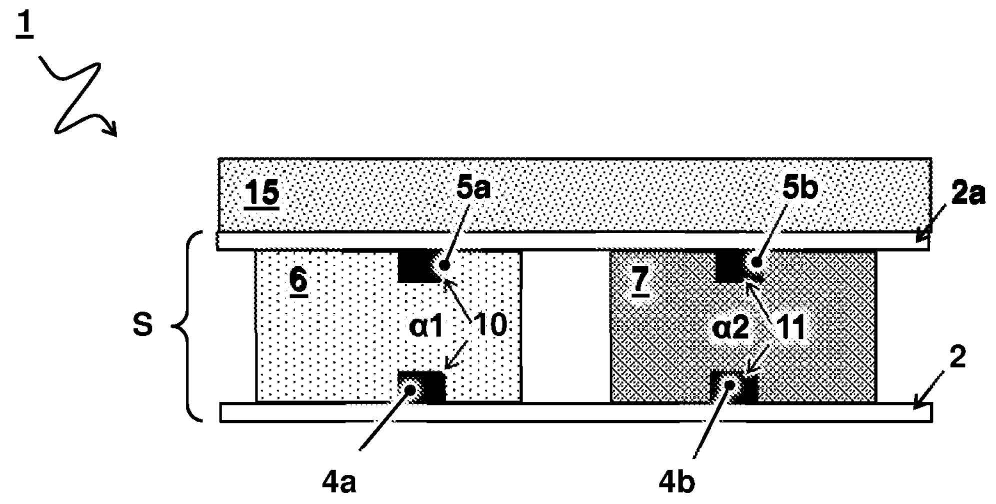
FIGS. 2A and B schematically depict a cross-section side view of a core body temperature sensor provided with one or more cover layers.
Figure 2B:
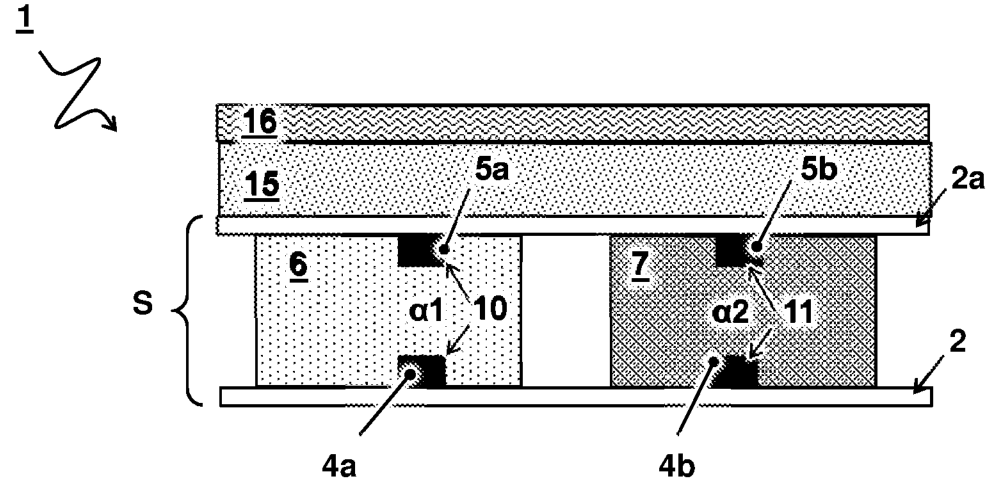
FIG. 2C schematically depicts a cross-section side view of a core body temperature sensor provided with an adhesive layer.

In other or further preferred embodiments, e.g. as shown in FIG. 2B the sandwich structure S is provided with a heat-spreader 16 to, in use, equalize the ambient temperature experienced by the at least first and second thermistor pairs 10,11. Preferably, heat-spreader 16 covers at least the first and second thermistor pairs 10,11.

Figure 2C:
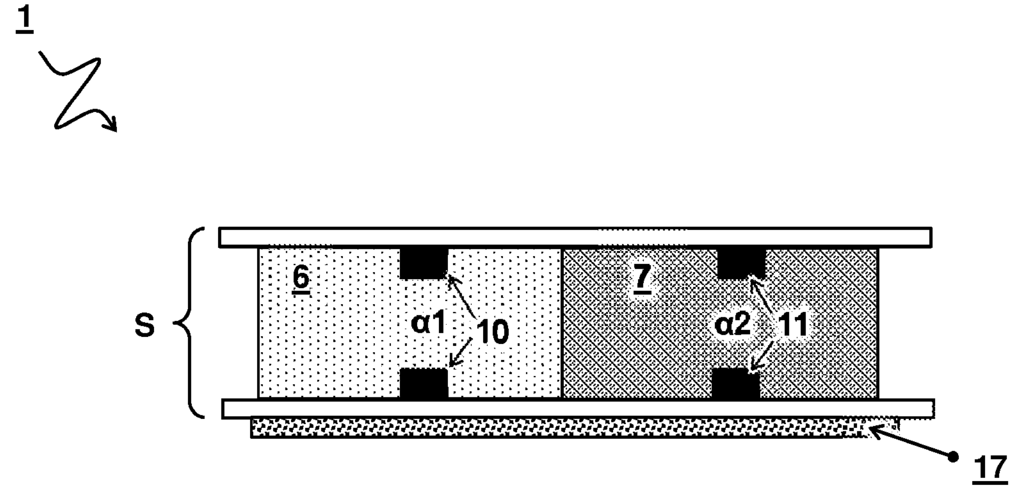

In a preferred embodiment, e.g. as shown in FIG. 2C the core body temperature sensor 1 comprises an adhesive layer 17, preferably a skin compatible adhesive layer, at a face for connecting to the surface 21 of the body 20. By providing the core body temperature sensor 1 with an adhesive layer 17 a patch may be formed that may be applied to an area of skin of a body 20, e.g. person without a need of additional fixation means. Preferably the skin compatible adhesive layer 17 enables affixing the core body temperature sensor 1 to a body at least for a duration of a measurement, preferably for a prolonged period of time. Preferably, the core body temperature sensor 1 may also be removed from the skin, e.g. after measuring a core body temperature, and re-applied, e.g. to a different area of surface 21 of the body 20. Inventors found that pressure sensitive adhesives and/or temperature conductive adhesives may be particularly suited.

Figure 3A:
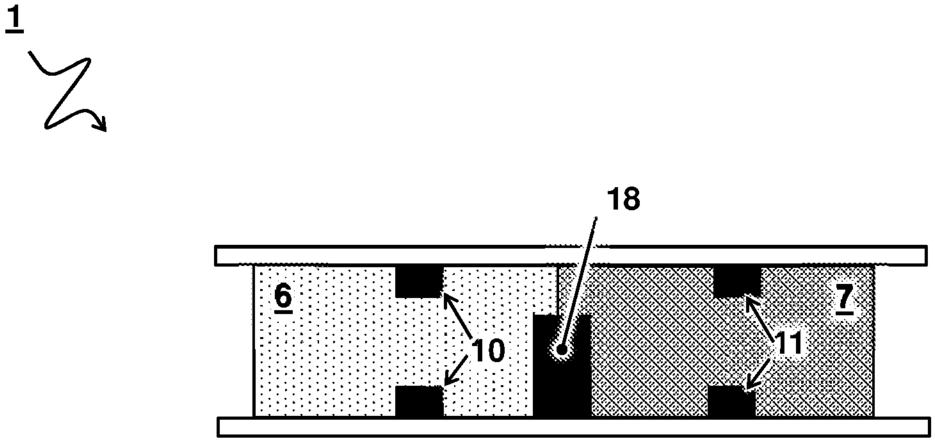
FIG. 3A schematically depicts a cross-section side view of a core body temperature sensor provided with a plethysmogram sensor.

In some embodiments, e.g. as shown in FIG. 3A, the core body temperature sensor 1 is provided with a means 18 to, in use, measure blood perfusion. Measuring blood perfusion may allow correcting for inaccuracies, e.g. in the model related to heat transport by skin perfusion. Such inaccuracies may e.g. relate to an inaccuracy in the assumption that all heat transfer through the thermal insulators 6,7 comes from the tissue below, whereas some of it may be transported parallel to the tissue by perfusion of blood. Preferably, the means 18 is a photoplethysmogram sensor (ppg sensor) to measure blood flow, e.g. blood perfusion. Preferably said mains is provided at a location between adjacent thermistor pairs 10,11. By measuring the blood perfusion at a location close to, preferably between, the thermistor pairs 10,11 said assumption may be validated and/or corrected.

Correction of core body temperature readings obtained by the core body temperature sensor may be of particular relevance for subjects, e.g. persons, that transit from one thermal state to another (e.g. from neutral to hot, or from hot to cold). That is, the heat flow through the core body temperature sensor 1 is not essentially governed by heat coining from the core body metabolism, and the contribution of heat flow via skin blood flow is variable over time. For subjects of which the heat flow through the core body temperature sensor 1 is not essentially governed by heat coming from the core body metabolism readings the model as described in relations to eqs 1 and 2 may be improved upon. Since heat flow models are generally based on the assumption that heat flow through a sensor is equal to the heat flow from the body metabolism, a temporal presence of additional heat flows, e.g. a heat flow due to local skin blood flow can lead to inaccuracies in the determination of the core body temperature TB.

Providing the core body temperature sensor 1 with a means 18 to, in use, measure blood perfusion can provide a reading, e.g. a temporal reading, of blood perfusion in a portion of skin that is in direct proximity to the thermistor pairs. Inventors found that with this reading a correction can be applied to the determined heat flow from the body metabolism allowing more accurate determination of the core body temperature TB.

Incorporation of a means to measure blood perfusion is based on a realization that metabolic heat flow (See e.g., F1 in FIG. 1B and $F_{met}$ in FIG. 6) is typically not the only heat flow towards the sensor. Heat flow due to skin blood flow ($F_{SBF}$) contributes to the observed heat flow at the sensor.

$$F_{sensor}=F_{metabolism}+F_{SBF} \quad \text{(eq.3)}$$

The contribution of $F_{SBF}$ can be less than basal blood flow (greater than basal contribution of metabolism to the heat flow measured by the sensor) or greater than basal blood flow (less than basal contribution of metabolism to the heat flow measured by the sensor). The magnitude of skin blood flow can be particularly pronounced for persons subjected to transient conditions, e.g. thermally stressful situations. Thermally stressful situations can be caused, e.g., by outdoor weather conditions, solar and/or thermal radiation, varying indoor conditions, and/or temporal varying personal circumstances including but not limited to but exercise, stress and medical conditions. Such thermally stressful situations can result in temporal (i.e. time dependent) changes in blood perfusion, e.g. local vasoconstriction/dilation and/or sweating or shivering, which can be picked-up by the means to measure blood perfusion 18 at a position in close proximity to the thermistor pairs.

Figure 6:
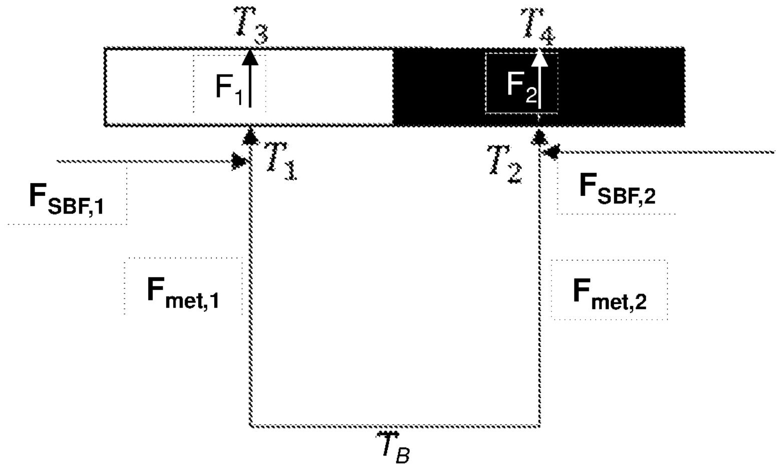
FIG. 6 provides a model of heat flows and temperature readings of a core body temperature sensor.

FIG. 6 provides a model of heat flows F including heat flows due to skin blood flow $F_{SBF}$ and temperature readings for a core body temperature sensor in use. Please note that, in line with FIG. 1B, heat flow F1 pertains to the heat flow across the first thermal insulator having a thermal resistance $R_1$ (see temperature recordings $T_1$ and $T_3$ and reference numerals 4*a*, 5*a* and 6 in FIG. 1B). Heat flow $F_2$ pertains to the heat flow across the second thermal insulator having a thermal resistance $R_2$ (see temperature recordings $T_2$ and $T_4$ and reference numeral 7 in FIG. 1B).

The heat flow through each of the thermistor pairs can be calculated using equations 4 and 5.

$$F_1=(T_1-T_3)/R_1=F_{met,1}+F_{SBF,1} \quad \text{(eq.4)}$$

$$F_2=(T_2-T_4)/R_2=F_{met,2}+F_{SBF,2} \quad \text{(eq.5)}$$

where: $F_1$ is the heat flow across the first thermistor pair and $F_2$ is the heat flow cross second thermistor pair; $F_{SBF,1}$ is the heat flux due to skin blood flow towards the first thermistor pair; and $F_{SBF,2}$ is the heat flux due to skin blood flow towards the second thermistor pair. Analogue to eq 1 $F_1$ and $F_2$ can respectively be determined from the recorded temperature difference across the respective thermistors $T_1-T_3$; or $T_2-T_4$ divided by the respective thermal resistance $R_1$,$R_2$.

Analogue to eq. 1, the core body temperature $T_B$ can calculated using the following set of equations:

$$T_B=F_{met,1}*R_{b,met}+T_1 \quad \text{(eq.6a)}$$

$$T_B=F_{met,2}*R_{b,met}+T_2 \quad \text{(eq.6b)}$$

$$T_B=(F_1-F_{SBF,1})*R_{b,met}+T_1 \quad \text{(eq. 6c)}$$

$$T_B=(F_2-F_{SBF,2})*R_{b,met}+T_2 \quad \text{(eq. 6d)}$$

where: $T_1$ is the recorded skin temperature at the first thermistor pair; $T_2$ is the recorded skin temperature at the second thermistor pair; and $$R_{b,met} = \frac{T_2 - T_1}{F_{met,1} - F_{met,2}} \quad \text{(eq.7)}$$

Similar to the procedure explained in relation to eq.2 the above set of equations (Eq 6a-d) can be rearranged to determine the core body temperature $T_B$ independent of $R_{b,met}$ provided a value for $F_{SBF}$ can be determined.

It was found that the $F_{SBF}$ value can be determined as follows:

$$F_{SBF}=\beta_0*Q_{10}*N \quad \text{(eq.8)}$$

where $Q_{10}$ is a local SBF regulation factor [unit less]; $\beta_0$ is a basal heat flow value at the abdomen in $W\cdot K^{-1}\cdot m^{-3}$; and N is a neural SBF regulation factor [unit less].

The local SBF regulation factor $Q_{10}$ is calculated according to:

$$Q_{10} = 2^{\frac{\Delta T_{sk}}{10}} \quad \text{(eq.9)}$$

where $\Delta T_{sk}$ is a difference between a recorded skin temperature and a standard neutral skin temperature that is set at 33.4° C. for healthy human individuals at equilibrium (at acclimatized conditions) on the abdomen. The value for the neutral skin temperature for other subjects, e.g. animals, may be looked-up from reference data or can be determined separately.

The basal heat flow at abdomen $\beta_0$ is determined according to:

$$\beta_0=V_{bl}*\rho_{bl}*c_{bl}*w_{bl,0} \quad \text{(eq.10)}$$

where $V_{bl}$ is the blood volume under the sensor in $m^3$; $\rho_{bl}$ is the density of blood (1069 $kg\cdot m^{-3}$ for healthy human individuals); $c_{bl}$ is the specific heat capacity of blood (3650 $J\cdot kg^{-1}\cdot K^{-1}$ for healthy human individuals); and $w_{bl,0}$ is the basal blood flow per $m^3$ tissue (0.0023095 $L\cdot m^{-3}\cdot s^{-1}$ at the abdomen for healthy human individuals). The blood volume under the sensor $V_{bl}$ is calculated from the total area of the sensor multiplied by the perfused skin thickness at the location of measurement. The perfused skin thickness can vary depending on a measurement location on the body (for the abdomen the perfused skin thickness is about 0.001 m). Like for the neutral skin temperature, the values for the respective parameters, may be determined separately or looked-up from reference data (See e.g., Human Thermoregulation—A synergy between physiology and mathematical modelling by Kingma; Maastricht, 2011, Universitaire Pers, ISBN: 978 94 6159 106 7; section 'Model parameters' on pages 127-131).

For neutral conditions (in equilibrium) skin blood flow is by definition equal to basal skin blood flow, hence $Q_{10}\times N=1$. Accordingly, a core body temperature sensor 1 including a means 18 to determine blood perfusion, e.g. a PPG sensor, can be used to determine a baseline value of heat flow due skin blood perfusion $F_{SBF,0}$ according to:

$$F_{SBF,0} = V_{bl} * \rho_{bl} * c_{bl} * w_{bl,0} = \beta_0 \frac{PPG_0}{PPG_0} = \beta_0 \quad \text{(eq.11)}$$

where values for $V_{bl}$; $\rho_{bl}$; $c_{bl}$; and $w_{bl,0}$ may be the respective values as described above in combination with known sensor dimensions and where $PPG_0$ represents an output reading of the means 18 to determine blood perfusion, e.g. an output voltage of a PPG sensor. Since the heat content of skin blood flow scales linearly with $w_{bl}$ a temporal value of heat flow due skin blood perfusion $F_{SBF,i}$ can be estimated using a temporal output of the sensing means 18 divided by the reference output, e.g., according to:

$$F_{SBF,i} = V_{bl} * \rho_{bl} * c_{bl} * w_{bl,i} = \beta_0 \frac{PPG_i}{PPG_0} = \beta_i \quad \text{(eq.11)}$$

where $PPG_i$ is the temporal output of the sensing means.

In case the skin temperature of a subject deviates from an equilibrium temperature over the course of a measurement the amount of heat flow that can be attributed to skin blood flow can be calculated via the perfusion measurement. For example, when skin temperature increases, e.g. due to fluctuations in ambient and/or to exercise or physical labor, this attribution can be subtracted from the total heat flux readings ($F_1$, $F_2$). Likewise in a cold condition the reduced influence of skin blood flow, e.g. to due vasoconstriction, on the total heat balance can be corrected for.

Figure 3B:
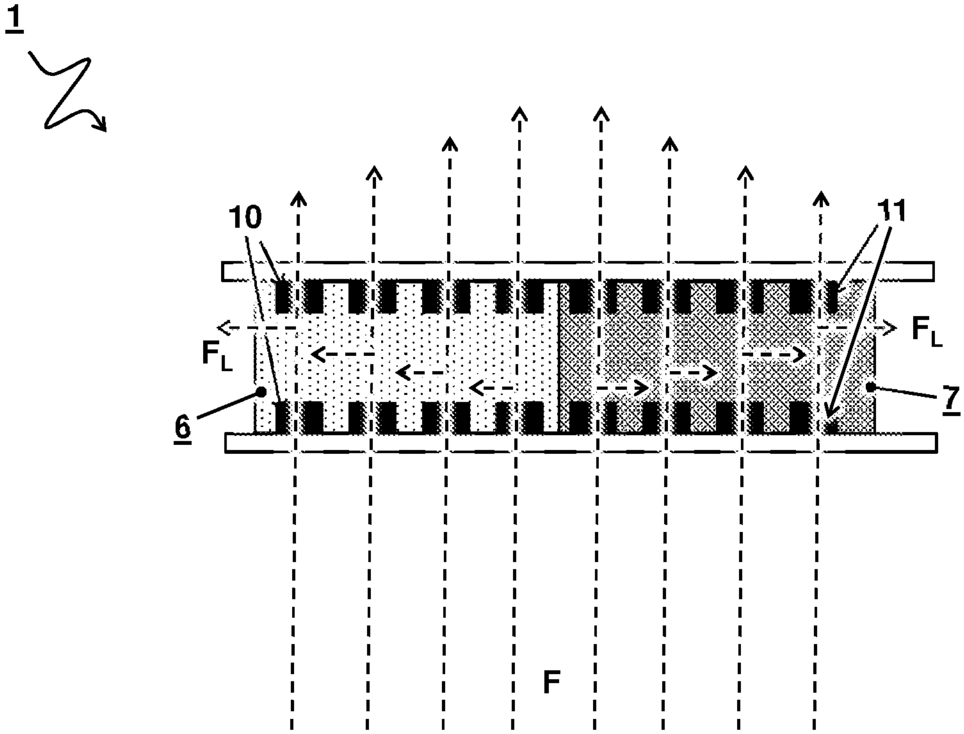
FIG. 3B schematically depicts a cross-section side view of a core body temperature sensor comprising an array of opposing thermistor pairs.

In some preferred embodiments, e.g. as shown in FIG. 3B, the core body temperature sensor 1 comprises one or more further thermistors in addition to the first and second thermistor pairs, e.g. three or more adjacent thermistor pairs. In some embodiments, e.g. as shown in FIG. 4, the additional third thermistor pair is, like the first and second thermistor pairs disposed across the first or second thermal insulator 6,7. Optionally, the core body temperature sensor 1 may comprise an array of adjacent thermistor pairs. Preferably, further thermistor pairs, e.g. an array, are distributed over the first and second thermal insulator 6,7. In one embodiment, e.g. as shown, the thermistor pairs are distributed evenly across the first and second thermal insulator 6,7. The additional thermistors and/or thermistor pairs provided may, in use, help verify contact quality between surface 21 of the body 20 and core body temperature sensor 1. For example, a poor contact, e.g. an air gap between core body temperature sensor 1 at a location of a first thermistors pair and surface 21, may be detected by an off temperature reading for the thermistor closest to the surface 21 of the body 20, e.g. a lower temperature reading compared to sensors that are in good thermal contact with the body. Alternatively or in addition, poor thermal contact may be identified by comparing the measured temperature gradient over the thermistor pairs. Contact errors, e.g. intermittent contact, may be identified by a fluctuating measurement value for the thermistor closes to the surface 21 of the body 20 and/or by a fluctuating heat gradient. Particularly in embodiments comprising an array of adjacent thermistor pairs further thermistor pairs may, in use, help characterize a level of lateral heat dissipation $F_L$ (lateral heat flow) in the sandwich structure in a direction between adjacent thermistor pairs. It will be appreciated, that the presented model for determining the core body temperature $T_B$ assumes that the heat flow over the thermistor pairs is dominated by the heat generated below the sensor in the core of body flowing to ambient over the thermal resistor. Additional heat flows, e.g. lateral heat flows such as side-ways lateral heat losses within the sensor and/or lateral heat flows relating to blood perfusion in the skin of the body may affect the obtained readings, as described above. Using a core body temperature sensor 1 comprising an array of opposing thermistors and/or provided with an additional means to measure blood perfusion, e.g. a PPG sensor, provides data which may be used to correct a determined core body temperature for said lateral heat dissipation effects.

According to a further aspect the present invention relates to a method for determining a core body temperature with improved accuracy, in particular a method for determining a core body temperature $T_B$ using a core body temperature sensor 1 comprising three or more of adjacent thermistor pairs. The method comprises providing a core body temperature sensor comprising three or more of adjacent thermistor pairs, contacting said core body temperature sensor to a surface of a body, obtaining a temperature reading for each of the thermistors comprised in the three or more of adjacent thermistor pairs. Recordings from two of the adjacent thermistor pairs may be used to determine a core body temperature, e.g. using the method described above. Providing the core body temperature sensor 1 with additional thermistors, e.g. one additional adjacent thermistor pair provide additional temperature readings which may advantageously be used to improve accuracy of the determined core body temperature $T_B$. For example, as described above, the additional temperature recordings may be used to identify possible poor contact between sensor and body. Accordingly, in one embodiment the method comprises determining the core body temperature using data from the three or more of adjacent thermistor pairs disregarding data from thermistor pairs with an off temperature reading, e.g. the thermistor pair with the smallest temperature drop. Alternatively or in addition, the additional temperature readings may at the at least third thermistor pair may be used to identify, e.g. characterize lateral heat flows. As described above lateral heat flows may negatively affect the accuracy of the determined core body temperature. Identification, preferably characterization of lateral heat flows may be used to improve the accuracy, e.g. correct the determined core body temperature. It will be appreciated that providing the core body temperature sensor 1 with more than three, e.g. an array of adjacent thermistors, for example a total of 4, 9, 16, or more, preferably in a 2D-arrangement, e.g. a 3×3 or 4×4 square array covering an area of surface 21 may improve the characterization of lateral heat flows. Accordingly, in another or further embodiment the sensor comprises and array of adjacent thermistor pairs, and the method comprises determining a lateral heat flow based on differences in obtained temperature readings between adjacent thermistors.

In another or further preferred embodiment, the method uses a core body temperature sensor 1 comprising a means 18 to measure blood perfusion, e.g., as described in relation to FIGS. 3A and 6. In the method the heat flow through the first and second thermal insulators 6,7 is derived from temperature readings of the first and second thermistor pairs 10, 11. In the method the derived heat flows are corrected for heat flow due to skin blood flow $F_{SBF}$. Correcting the heat flow through the first and second thermal insulators with heat flow due to skin blood flow allows a more accurate determination of heat flow from the core metabolism and accordingly for a more accurate determination of the core body temperature. In particular, determining a value of heat flow due to skin blood flow comprises multiplying a predetermined baseline value of heat flow due skin blood perfusion ($\beta_0$) with a ratio of a temporal output value of the means to measure blood perfusion ($PPG_i$) to a reference value of the means to measure blood perfusion ($PPG_0$). Generally, correcting comprises recording a temporal output (time dependent output), e.g. a PPG sensor output voltage, of the means to measure blood perfusion, The temporal output of the means to measure blood perfusion is divided by a reference output of said means. As described above, the ratio between the temporal output of the means to blood perfusion and the reference output of said means was found to scale with heat flow due to skin blood flow $F_{SBF,i}$. In a preferred embodiment, the magnitude of the contribution of heat flow due to skin blood flow is determined by multiplying said ratio with a baseline value $F_{SBF,0}$ of heat flow due skin blood perfusion. The baseline value of heat flow due skin blood perfusion may be determined as described in relation to eq. 11.

According to yet a further aspect the present invention relates to a method for the manufacturing of a core body temperature sensor 1 for measuring the core temperature of a body 20 via applying the core body temperature sensor 1 to a surface 21 of the body 20. The core body temperature sensor 1 includes a means 18 to measure blood perfusion. The manufacturing of the means to measure blood is not necessarily part of the invention, the means may, e.g. by a commercially available PPG sensor. The means is preferably provided in close proximity to the first and second thermistor pairs, e.g. between the thermistor pairs. By positioning the means to measure blood perfusion in close proximity to the thermistors allows determining blood perfusion in the same area, e.g. the same type of skin.

Figure 4A:
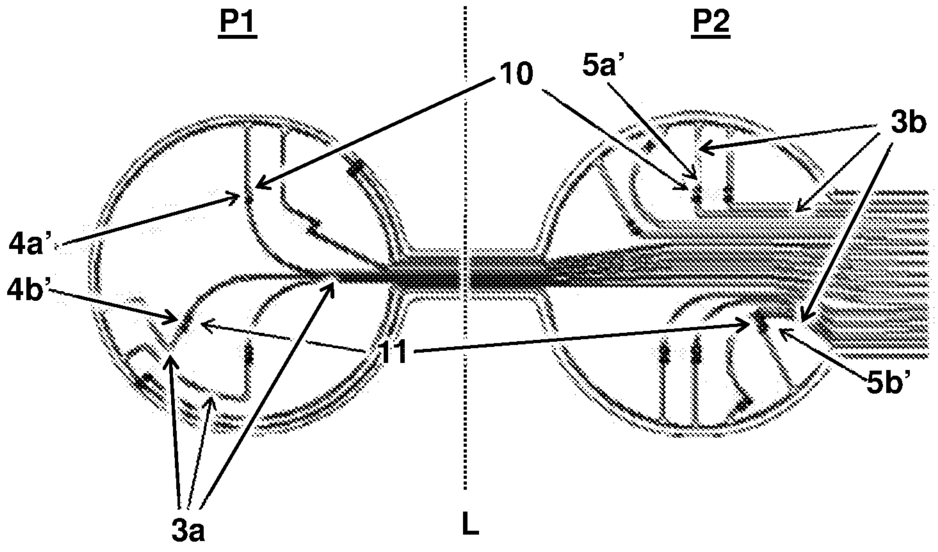
FIG. 4A schematically depicts a pattern defining conductive lead and thermistor locations.

FIG. 4*a* schematically depicts a design, e.g. a pattern, defining conductive leads that may be used in the manufacturing of the core body temperature sensor 1. In the design conductive leads 3*a*, define positions 4*a*' and 4*b*' for the first and second thermistor 4*a*, 4*b* in a first pattern P1. The conductive leads 3*b* define positions 5*a*' and 5*b*' for the third and fourth thermistor 5*a*, 5*b* in a second pattern P2. Dotted line L indicates a line over which a carrier may be folded to form a sandwich structure S, as will be explained herein below. The method for the manufacturing of a core body temperature sensor 1 comprising: providing conductive leads 3*a* for electrically connecting at least a first and second adjacent thermistor 4*a*, 4*b* onto a first carrier 2 in a first pattern P1; providing conductive leads 3*b* for electrically connecting at least a third and fourth adjacent thermistor 5*a*, 5*b*, onto a second carrier 2. The method further comprises: providing, e.g. placing, the thermistors 4*a*, 4*b*, 5*a*, 5*b* onto the respective conductive leads 3*a*, 3*b*, 4*a*, 4*b*; providing a first thermal insulator 6 to cover the first thermistor 4*a*; and providing a second thermal insulator 7, different from the first adjacent to the first pattern P1 to cover the second thermistors 5*a*. In a preferred embodiment, the method further comprises sandwiching the first and second thermal insulators 6,7 between the first area of the carrier 2 and one of the second carrier area of the carrier 2 to form an essentially planar sandwich structure S wherein the first and second patterns P1,P2 are arranged to, upon sandwiching, form at least a first thermistor pair 10 of opposing thermistors 4*a*,5*a* across the first thermal insulator 6 and an adjacent second thermistor pair 11 of thermistors 4*b*,5*b* across the second thermal insulator 7 and wherein the thermal resistance α1 of the first thermal insulator 6 and the thermal resistance α2 of the second thermal insulator 7 differ to, in use, allow calculating the core body temperature $T_B$ from measured temperature differences across the first and second thermal insulators 6,7 resulting from an outward heat flux F from the core of the body to ambient.

In some preferred embodiments, providing the conductive leads comprises printing, e.g. printing of a conductive ink or printing of an ink which may be converted, e.g. reduced, to form an electrically conductive structure. Suitable printing methods include but are not limited to inkjet printing, screen printing, offset printing, flexo-printing, and (roto)gravure printing. Preferably, formed electrically conductive leads (structures) may be stretchable by at least 1%, preferably at least 5%, e.g. 7% more preferably by at least 10%, e.g. 15%, 20% or even 30% up to 100% without essential loss of functionality. Suitable inks may be selected from a list consisting of but not limited to EMS CI-1062, EMS CI-2051, EMS CI4040, Dupont PES 73, Dupont PE671, and Dupont PE971. Stretchability, may be provided by in combination with pattern design, e.g. a pattern suited to provide wavy or meandering conductive leads. It will be appreciated that optionally the thermistors may be provided by printing, e.g. by printing of a NTC material.

In a preferred embodiment, forming the sandwich structure S comprises folding the carrier 2. In other words, the method further comprises forming the first and second carriers into a single folded structure. Preferably, the thermistors 4*a*, 4*b* and 5*a*, 5*b* are provided on a single carrier in patterns P1, P2 that allow folding the carrier to form the essentially planar sandwich structure S. Providing all thermistors and/or conductive leads on single carrier may improve the manufacturability of the core body temperature sensor. For example, complexity of the manufacturing process may be reduced and/or manufacturing speed may improve. Providing all thermistors and/or conductive leads on single carrier to allow folding may reduce aligning requirements during the sandwiching step. In other words, folding may eliminate an alignment step to form pairs of opposing thermistors. Inventors found that suitable carriers include foils such as polymer foils, e.g. thermoplastic polyurethane (TPU), polyethylene terephthalate (PET) and polyethylene naphthalate (PEN) foils, preferably with a thickness in a range between 0.05 and 1 mm.

Figure 4B:
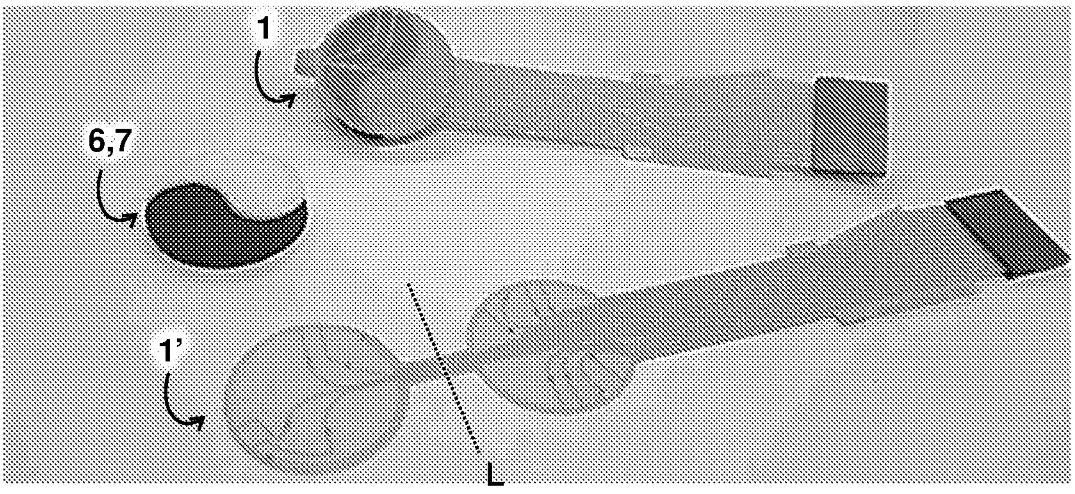
FIG. 4B depicts a photograph of a core body temperature sensor manufactured according to the disclosed method.

FIG. 4B displays a photograph of a core body temperature sensor 1 manufactured using the method of the invention. The core body temperature sensor 1 was manufactured in a method comprising providing a flexible substrate with conductive leads and thermistors in a pattern as described hereinabove. First and second thermal insulators 6,7 were placed onto the formed intermediate product 1' after which the assembly was folded along line L.

In another or further preferred embodiment, the method further comprises printing a skin compatible thermoconductive adhesive material to from a skin compatible thermoconductive adhesive layer 17 at a face for, in use, connecting to the surface 21 of the body 20 to form a core body temperature sensor patch.

Figure 5:
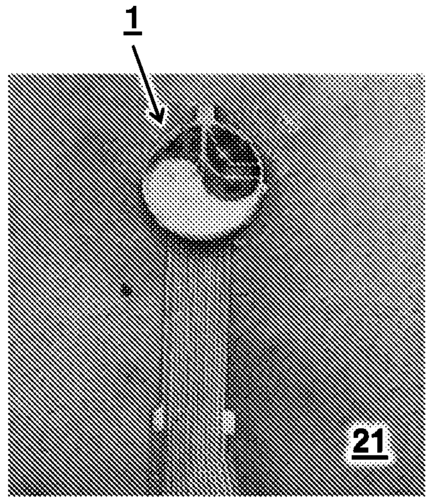
FIG. 5 depicts a photograph of a core body temperature sensor manufactured applied to the skin of a subject and an obtained core body temperature time profile.
Figure 5:
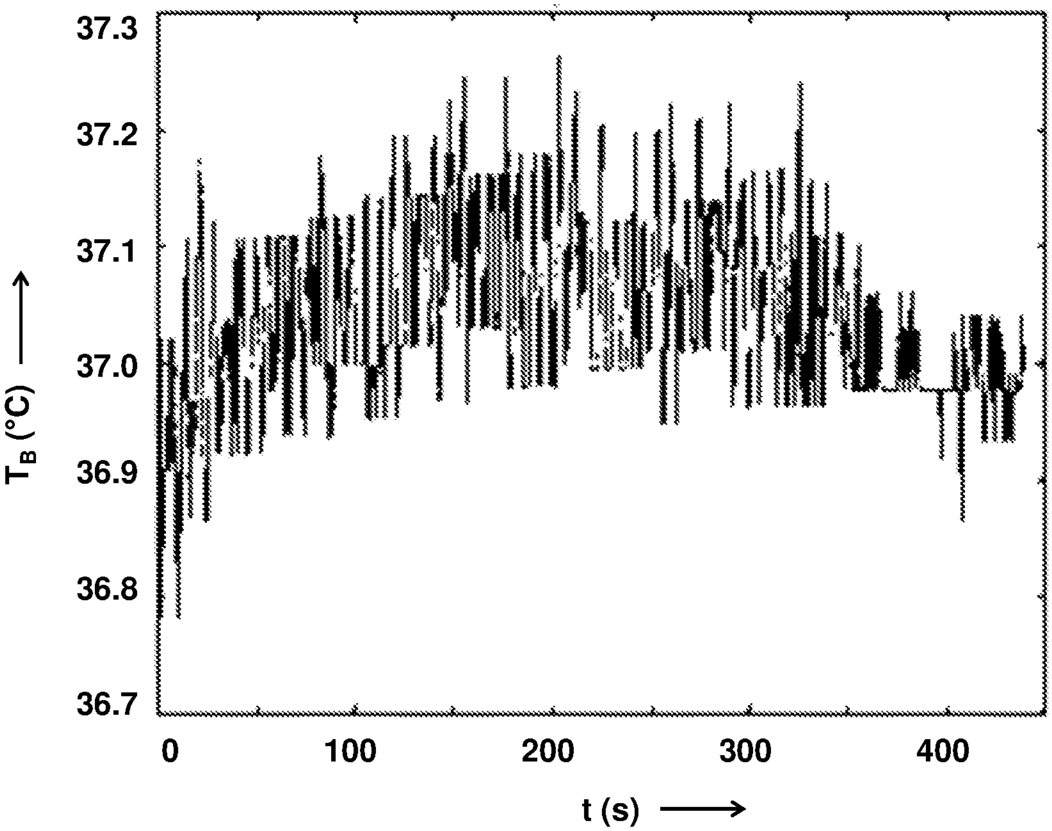

FIG. 5 displays a photograph of a core body temperature sensor 1 comprising a skin compatible adhesive layer 17 adhered to an area of skin 21 on the torso of a person. As evidenced in the graph below said core body temperature sensor 1 may be used to determine and follow the core body temperature $T_B$ of that person over a period of time. Advantageously, the core body temperature sensor 1 has a high precision small error allowing determining core temperature within 0.05° C. Advantageously, the core body temperature sensor 1 has fast response time, allowing identifying short temperature variations, e.g. a sampling frequency up to 10 Hz.

For the purpose of clarity and a concise description, features are described herein as part of the same or separate embodiments, however, it will be appreciated that the scope of the invention may include embodiments having combinations of all or some of the features described. For example, while embodiments were shown for a core body temperature sensor comprising a ppg-sensor, also alternative ways may be envisaged by those skilled in the art having the benefit of the present disclosure for achieving a similar function and result. E.g. adjacent thermistor pairs may be combined or split up into one or more alternative components. The various elements of the embodiments as discussed and shown offer certain advantages, such as high accuracy, good response speed and good manufacturability. Of course, it is to be appreciated that any one of the above embodiments or processes may be combined with one or more other embodiments or processes to provide even further improvements in finding and matching designs and advantages. It is appreciated that this disclosure offers particular advantages to measuring of core temperatures of persons and/or animals, and in general can be applied for any application pursuing the determination of a core body temperature in a non-invasive way.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

The invention claimed is:

1. A core body temperature sensor for measuring a core body temperature of a body via applying the core body temperature sensor to a surface of the body, the core body temperature sensor comprising:

a first thermistor pair of opposing thermistors across a first thermal insulator;; and a second thermistor pair, adjacent to the first thermistor pair, of opposing thermistors across a second thermal insulator, wherein the core body temperature sensor is a planar sandwich structure formed of at least the first thermistor pair and the second thermistor pair across the first thermal insulator and the second thermal insulator, respectively, that are sandwiched between a first carrier and a second carrier opposite the first carrier of the planar sandwich structure, wherein thermal resistance of the first thermal insulator and thermal resistance of the second thermal insulator differ to, in use, allow calculating the core body temperature from measured temperature differences across the first thermal insulator and the second thermal insulator, the measured temperature differences resulting from:

an outward heat flux from a core of the body to ambient, and a heat flow due to a skin blood perfusion, wherein the core body temperature sensor is further configured with a sensor that measures blood perfusion, wherein the sensor that measures blood perfusion is disposed between the first thermistor pair and the second thermistor pair, and configured to independently determine blood perfusion separate from temperature measurements conducted by the at least the first thermistor pair and the second thermistor pair, and wherein the core body temperature sensor is configured to:

determine the heat flow due to the skin blood perfusion;

adjust, based on the determined heat flow due to the skin blood perfusion, a measured total heat flow to correspond to a metabolic heat flow; and calculate, using the adjusted measured total heat flow, a core body temperature value.

2. The core body temperature sensor according to claim 1, wherein the first carrier and the second carrier are formed from a single folded structure.

3. The core body temperature sensor according to claim 1, wherein the sandwich structure is provided with a thermally insulating cover layer to an outward face of the sandwich structure to, in use, shield the core body temperature sensor from ambient temperature fluctuations.

4. The core body temperature sensor according to claim 1, wherein the sandwich structure is provided with a heat-spreader to, in use, equalize the ambient temperature experienced by the at least first and second thermistor pairs.

5. The core body temperature sensor according to claim 1, wherein the sensor comprises a skin compatible adhesive layer at a face for connecting to the surface of the body, thereby forming a core body temperature patch.

6. The core body temperature sensor according to claim 1, further comprising a stretchable conductive wiring arranged to facilitate reading out signals from the thermistors.

7. The core body temperature sensor according to claim 1 comprising three or more adjacent thermistor pairs, wherein the three or more adjacent thermistor pairs are distributed across the first thermal insulator and the second thermal insulator.

8. The core body temperature sensor of claim 7, wherein the three or more adjacent thermistor pairs are arranged as an array of adjacent thermistor pairs.

* * * * *